June 13, 1933.  F. R. BICHOWSKY  1,914,101
REFRIGERATING APPARATUS
Filed Sept. 20, 1930
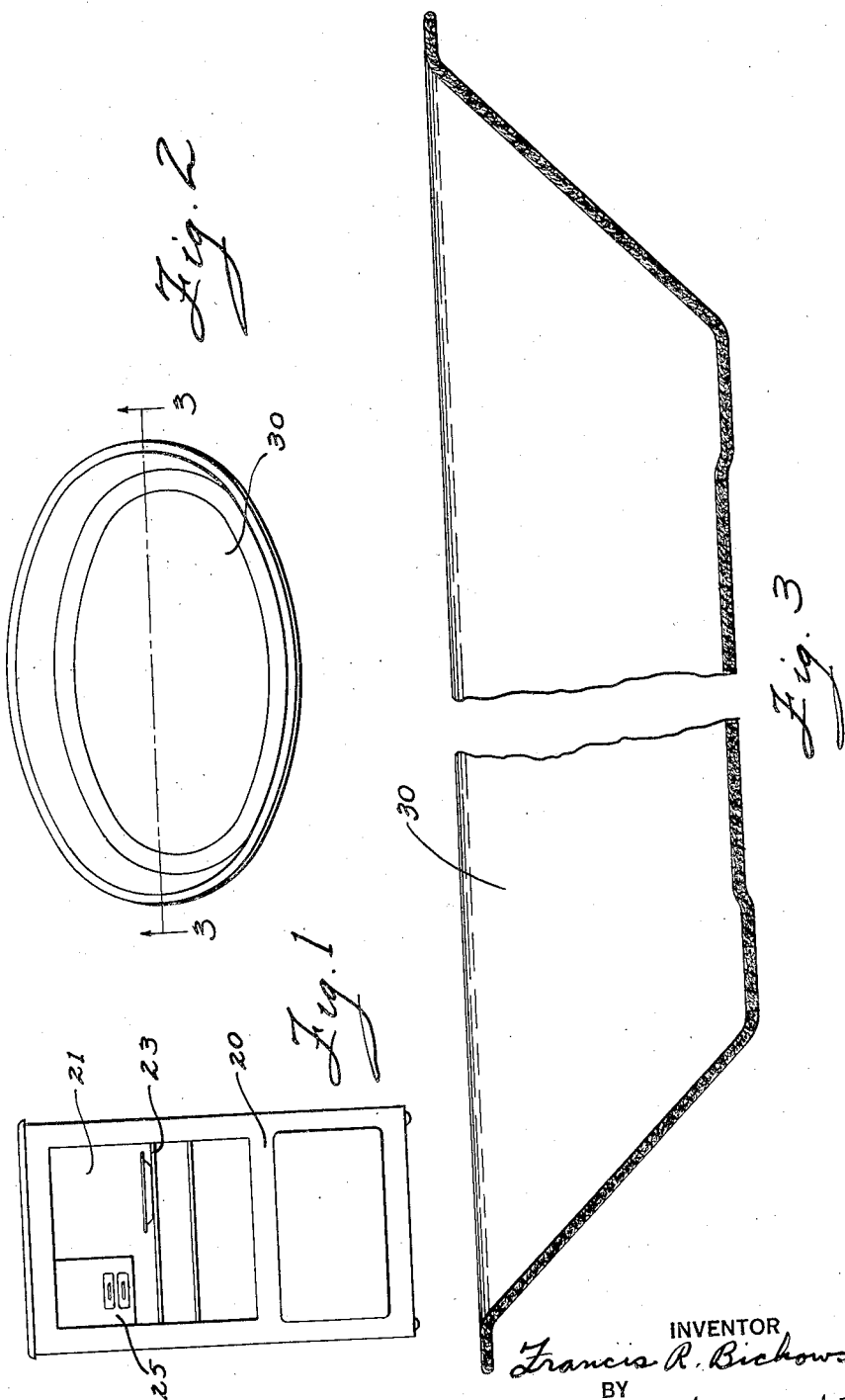
INVENTOR
Francis R. Bichowsky
BY
Spencer, Hardman and Jehn
ATTORNEY Patented June 13, 1933

1,914,101

UNITED STATES PATENT OFFICE

FRANCIS R. BICHOWSKY, OF WASHINGTON, DISTRICT OF COLUMBIA, ASSIGNOR TO FRIGIDAIRE CORPORATION, OF DAYTON, OHIO, A CORPORATION OF DELAWARE

REFRIGERATING APPARATUS

Application filed September 20, 1930. Serial No. 483,183.

This invention relates to refrigerating apparatus and more particularly to dishes for use in such apparatus.

One of the objects of this invention is to provide means for preventing any discoloration or sliminess of fresh meat in refrigerators.

Further objects and advantages of the present invention will be apparent from the following description, reference being had to the accompanying drawing, wherein a preferred form of the present invention is clearly shown. In the drawing:

Fig. 1 is a view of a refrigerating apparatus embodying features of the invention;

Fig. 2 is a perspective view of a dish embodying features of the invention; and

Fig. 3 is an enlarged view in cross-section taken along the line 3—3 of Fig. 2.

It has been found that fresh meat in refrigerators whose temperature is below 50° F. when left in contact with a non-absorbent surface, such as a china plate, or with an absorbent untreated plate, becomes slimy and unpalatable on the surface in contact with the plate.

Fresh meats whose surface is exposed to air turn black, and develop odor.

My invention consists of an absorbent plate, dish or other container which will partially absorb the sweat of the meat, and will partially prevent access of air at the point of contact between the meat and plate, said plate or dish being treated with a deoxidant or other preservative preventing the discoloration of the surface of the meat resting on the container.

Referring to the drawing, the numeral 20 designates a refrigerating apparatus which includes a food compartment 21 provided with one or more shelves 23 for food to be refrigerated. The apparatus 20 is adapted to cool the food in the compartment 21 to a temperature below 50° F. by air circulating therein in contact with a cooling element 25 in the well-known manner.

A dish 30 for preventing any discoloration or sliminess of fresh meats in refrigerators is adapted to be placed in the apparatus 20 for keeping the meats at the proper temperature while the dish serves to prevent discoloration of the meat as well as to prevent the meat from becoming slimy. Such a plate may be made of unsized wood pulp paper, or unglazed porcelain which has been treated with soluble sulfites, or other meat preservative, or they may be made of partially washed paper pulp made by the sulfite process, and which shall contain a small percentage of soluble sulfite. Preferably, sodium sulfite is used as the preservative. This may be accomplished by utilizing a part of the sulfite which is used to disintegrate the wood into pulp. This sulfite is allowed to remain in the pulp so that the manufactured plate is impregnated with the sulfite.

The chemical action of the sulfite on the blood or sweat of the meat will prevent discoloration of the meat. None of the sulfite is absorbed by the fibres of the meat. Since the container is constructed of porous material it will absorb the sweat of the meat and partially prevent access of air thereto.

While the form of embodiment of the invention as herein disclosed, constitutes a preferred form, it is to be understood that other forms might be adopted, all coming within the scope of the claim which follows.

What is claimed is as follows:

A refrigerator dish for preventing discoloration and sliminess of fresh meat placed thereon, said dish being constructed of unsized pulp paper adapted to absorb the sweat of the meat and to partially prevent access of air at the point of contact between the meat and dish, said dish being impregnated with a soluble sulphite.

In testimony whereof I hereto affix my signature.

FRANCIS R. BICHOWSKY.